Figure 1:
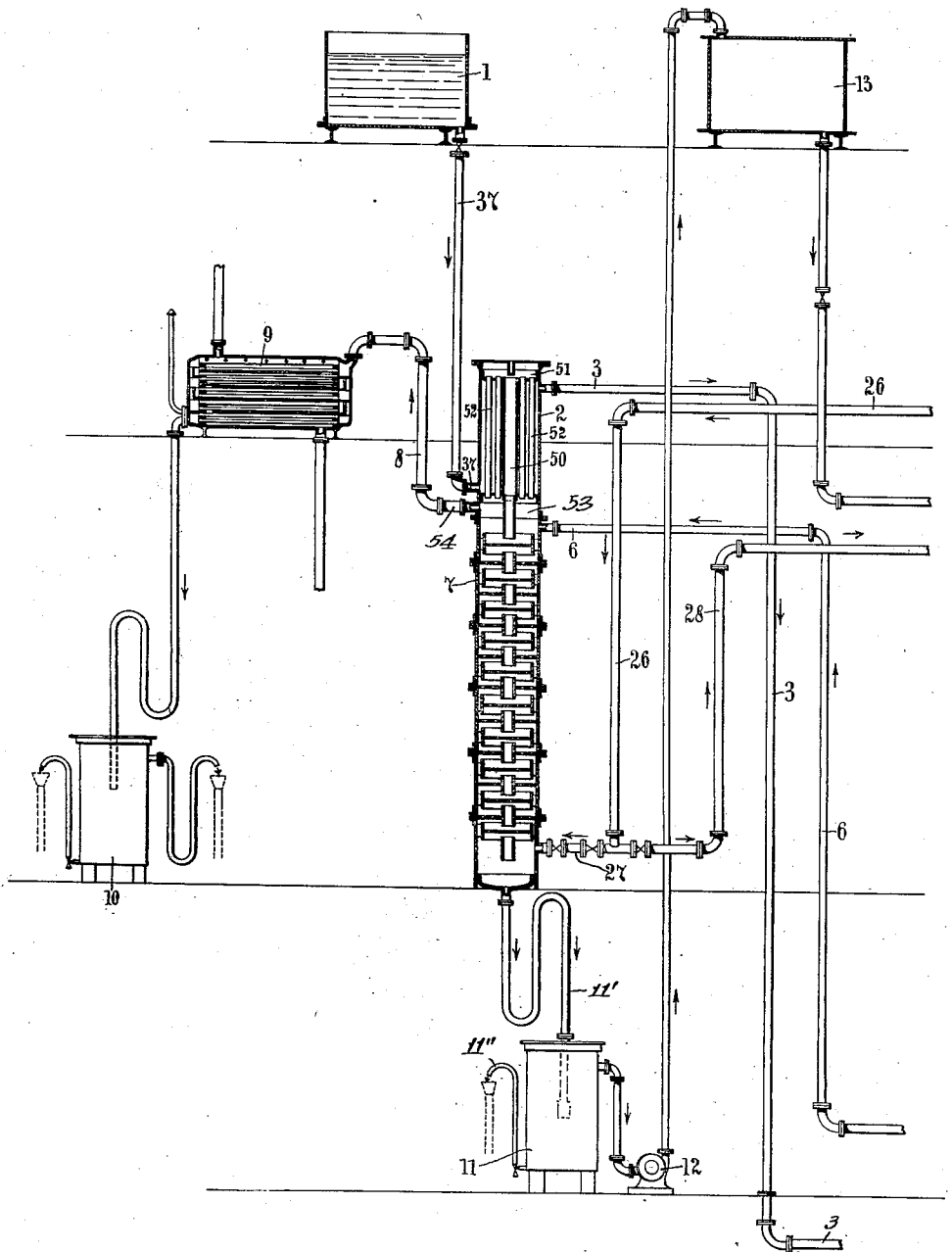

C. H. BORRMANN.
PROCESS AND APPARATUS FOR CONTINUOUSLY DISTILLING MINERAL OILS AND THE LIKE.
APPLICATION FILED JULY 29, 1912.

1,220,067.

Patented Mar. 20, 1917.
2 SHEETS—SHEET 1.

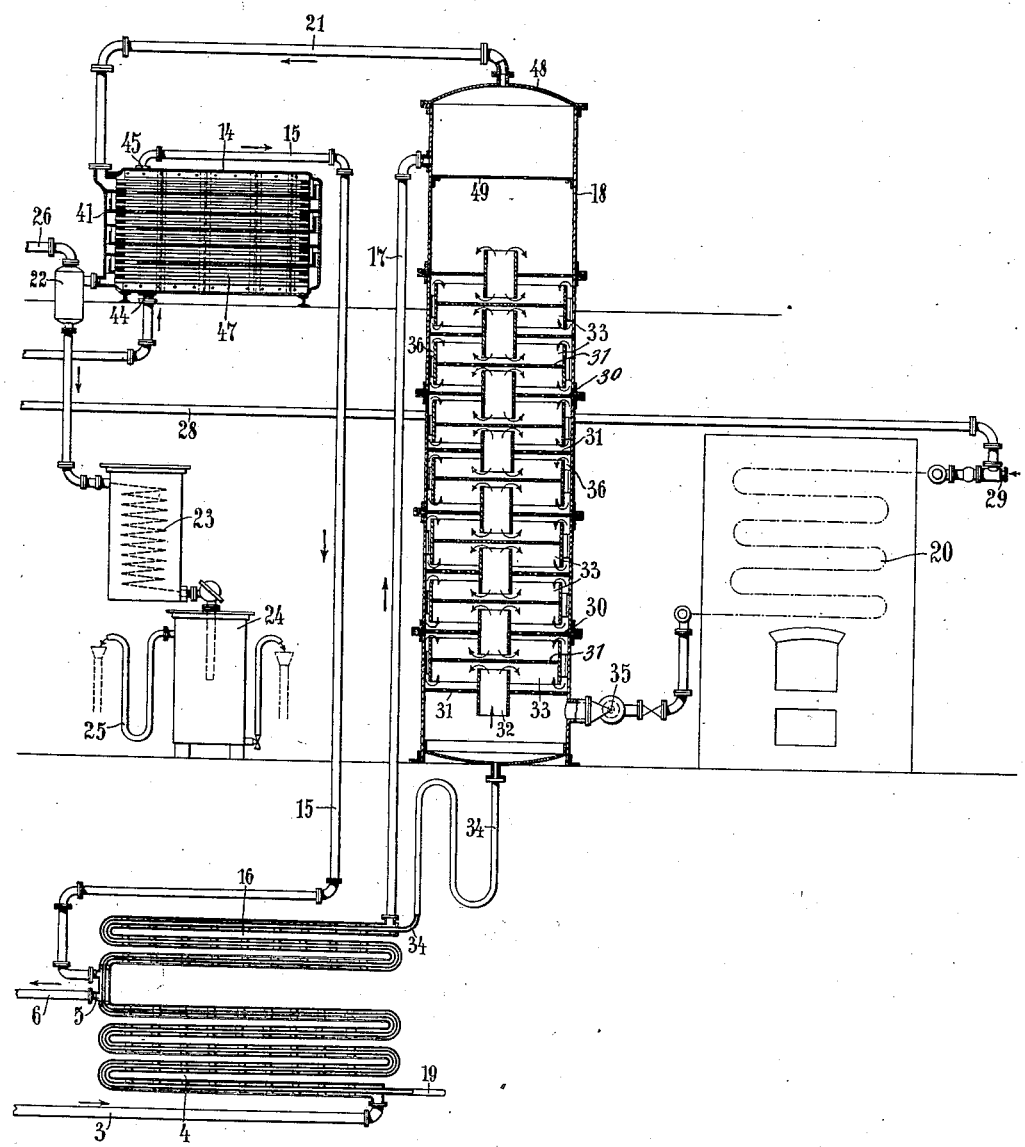

UNITED STATES PATENT OFFICE.

CARL HEINRICH BORRMANN, OF ESSEN-ON-THE-RUHR, GERMANY.

PROCESS AND APPARATUS FOR CONTINUOUSLY DISTILLING MINERAL OILS AND THE LIKE.

1,220,067.      Specification of Letters Patent.      Patented Mar. 20, 1917.

Application filed July 29, 1912. Serial No. 712,176.

*To all whom it may concern:*

Be it known that I, CARL HEINRICH BORRMANN, a citizen of the Empire of Germany, and residing at Essen-on-the Ruhr, Germany, have invented a certain new and useful Improved Process and Apparatus for Continuously Distilling Mineral Oils and the like, of which the following is a specification.

The object of the present invention is a process and apparatus for distilling mineral oils or the like by superheated steam and particularly the recovery of this superheated steam in the apparatus before it loses its latent heat so that the steam is not subjected to condensation in any part of the apparatus and may be used again.

A further object of my invention is to be seen in the fact that the distillation is not effected as in the customary apparatus in a distilling kettle, but is effected by direct heat introducing superheated water vapor into a column apparatus and by condensing the oil vapors alone while the water vapor is again superheated and reintroduced into the column so that its condensation is avoided.

It is a further object of the present invention to use the latent heat of the water vapor anew instead of wasting the same as heretofore into the atmosphere.

The effect that the water vapor when reintroduced into the column, is charged with carbureted hydrogen having a low boiling point, cannot be considered as harmful or as a disadvantage as means are provided for abstracting part of the superheated vapor before its reintroduction into the apparatus.

In the accompanying drawing Figures 1 and 2 are detailed views of the preferred form of my apparatus for carrying my process into practice, showing the columns and vessels in longitudinal section.

Crude oil flows from a tank 1 through a pipe 37 under a suitable pressure which can be obtained, for example, by placing the tank 1 at a greater elevation (see Fig. 1) than the dephlegmator 2 in which the crude product is heated by the product of distillation flowing through the dephlegmator.

The vapors and gases entering the column yield part of their heat to the crude oil entering through the conduit 37; the crude oil rises from the foot of the pipe 37 and leaves through the pipe 3. The liquid heated already to about 60° C. flows from the dephlegmator through the pipe 3 and is further heated by the residue of the main distillation in a heat exchange apparatus 4, consisting of a system of concentric pipes (see Fig. 2), one liquid flowing through the inner pipe and the other through the smaller space between the walls of the pipes. The crude product preliminarily heated to about 94° C. flows through the branch pipe 5 and through the pipe 6 to the first column 7, Fig. 1. The crude product here trickles through all the compartments of the first column and passes through an S shaped pipe 11' connected to the bottom of the column 7 and extending half way into the defecator 11. The mixture of oil and condensed steam, due to the water in the oil, is introduced from above to about the middle of the receptacle and the oil and water separate on account of ιe difference in their specific gravity. The water is removed through a suitable pipe 11", and the crude product from which the benzin has been removed, is lifted by a centrifugal pump 12 or similar mechanical device into another tank 13 at the same level as the tank 1. The crude product from which the constituents having a low boiling point have been removed in the first column 7 flows as an intermediate product from the tank 13 through pipe 44 to the bottom of the receptacle 14 serving as cooler, in which the gases and vapors coming from the main column 18 through the pipe 21, are cooled off by the oil coming from the tank 13, which gases and vapors in turn yield their heat to said oil. The intermediate product from 13 preliminarily prepared in this manner is heated in the receptacle 14, leaves the same at a temperature of about 140° C. and passes through the pipe 15 into a heat exchange apparatus 16 which is also heated by the residues from the main column 18.

The first product leaves the heat exchange apparatus 16 through the pipe 17 and passes at a temperature of about 175° C. into the main column 18 in which it trickles from compartment to compartment. The residue separated from the products having a medium boiling point collects on the bottom of the column 18, heats the two heat exchanges 16 and 4, which may be united as one apparatus if desired, and is removed from the plant through the pipe 19.

Superheated steam is used as the medium for heating the main column 18. The same flows from the superheater 20 through the inlet 35 (Fig. 2) through the bottom of the main column into the same, passes through the main column and mixes here with the distilled products of medium boiling point. The mixture leaves the column 18 through the pipe 21 at a temperature of about 170° C. and enters into the top of the receptacle 14 in order to be cooled therein and simultaneously to heat the intermediate product flowing in at the bottom of the receptacle. The substances having a medium boiling point such as petroleum used for lighting purposes are here condensed. Steam having a temperature of 100 C. or over and the non-condensed distillate leave the bottom of the receptacle and flow to the separator 22. The liquid and vapors are here separated. The distillate condensed in the receptacle 14 flows through a worm 23 and thence to the defecator 24 in which the condensed distillate is separated from any water carried along with it. The condensed distillate, as for instance in the case of mineral oils, petroleum for lighting purposes, can be drawn off through the pipe 25. The steam having a temperature of about 105° C. and still carrying with it gases of low boiling point passes out of the separator 22 into the pipe 26 and is then for the most part returned through the pipe 28 to the superheater 20. A portion of the steam is, however, supplied to the first column 7 through the branch pipe 27. Live steam from a suitable source is then admitted to the superheater 20. In this manner a constant circulation is maintained in my apparatus through the main column 18, the receptacle 14 and the superheater 20.

The steam supplied through branch pipe 27 is used for heating the first column 7. The same enters at the bottom of the column and passes through the column from compartment to compartment. The distilled gases together with the steam flow through the dephlegmator 2 and here heat the crude oil flowing out of tank 1. Simultaneously, however, the temperature of the steam and distilled gases is reduced, the steam is condensed and used when flowing through the dephlegmator for washing and rectifying the expelled distillate. Both the steam which is for the most part condensed and the gaseous distillate leave the dephlegmator 2 through the pipe 8 at a temperature of about 75° C. to 80° C. and flow to the cooler 9 which is cooled by any suitable cooling medium. The gaseous distillate is here condensed, and the water and condensed distillate flow to the defecator 10, in which the condensed distillate floats on the water and can be at once drawn off. The receptacles 9 and 14 are of similar construction.

It will be readily understood from the above that, according to my process, continuous fractional distillation of mineral oils and similar substances is possible without material losses of heat. The latent heat of the steam is not lost during the circulation in the main column apparatus 18.

The upper part of the main column 18 (Fig. 2) comprises a cylindrical space 48 subdivided by a perforated bottom 49. Above this bottom 49 the pipe 17 communicates with the apparatus 16 and the pipe 21 for the exhaust of the gases and vapors is connected to the top of said column. The enrichment of the steam in this circulation with gases of low boiling point is prevented by tapping off a portion of the steam for heating the first column, the substances of low boiling point detrimental to the circulation with superheated steam being simultaneously driven off.

No vacuum for distillation is employed in the process as described above by way of example. According to the nature of the crude products either a vacuum or pressure may be used for the fractional distillation.

Referring to Fig. 2, the column 18 is subdivided into individual compartments in known manner by perforated bottoms or partitions 30, 31, and bell bottoms 36 or similar bottoms, as shown in Fig. 2 for example, which allow the downwardly trickling liquid to pass through downward, but do not allow the passage of the gases upward.

In the apparatus shown by way of example in Fig. 2 the perforated bottoms 30 and 31 are arranged alternately. The bottoms 30 carry vertically disposed tubes 32, each of which leads from the lower partition 31, forming the bottom of the lower compartment, to the top of the compartment next above, i. e. to the next partition 31. Further, the perforated bottoms 31 are arranged in annular casings 33 which form with the wall of the column annular channels 36, each of which leads from one partition 30, i. e. from the bottom of one compartment, to the partition 30 next above, i. e. to the top of the compartment next above.

A separation of the liquid in the column is not effected within the same. The crude oil is simply preheated within the column by the vapors coming from the column, whereby these vapors are partly condensed. As shown in Fig. 1, the vapors are guided from the column 7 through a centrally arranged pipe 50 first into the upper chamber 51 and sink then through the cooling pipes 52 into the lower pipe chamber 53 whence they are in a partly condensed state guided into the column while the parts not condensed enter the pipe 8 through the stem 54 and reach the cooler 9.

The distillation is effected as follows:

The vapors and steam entering through the lowest tube 32 move in the direction indicated by the arrows in consequence of the arrangement of the central tubes 32 and the casings 33. It is obvious that in the individual compartments the steam loaded with the expelled gases moves forward together with the downwardly trickling liquid, and is forced toward the wall of the column by the following gases and steam on the bottom of each compartment. The steam and gases rise at the wall of the column through the annular channel to the top of the next compartment, flow in a unidirectional current with the downwardly trickling liquid onto the bottom of the compartment and pass hence through the central tube 32 to the top of the compartment next above.

It is to be understood that my herein described process is not limited to the apparatus as described and shown, but that any other suitable apparatus may be used for carrying it into practice.

I claim:—

1. A process of continuously distilling mineral oils or the like consisting in preheating and dehydrating the oil, distilling the oil vapors by superheated steam, leading vapors and steam through certain heat exchangers, dividing the mass at a certain point of the circulation, using one part of the same for the further distillation of the oils by allowing it to resume its cyclic course, and finally removing one portion of the same from said cyclic course for stripping the oil of its lighter vapors.

2. A process of continuously distilling mineral oils or the like, consisting in subjecting the oil to the action of a mixture of partly cooled steam and oil vapor, distilling the mixture in a cyclic course at the beginning by superheated steam and finally by a mixture of superheated steam and oil vapor.

3. Apparatus for the continuous distillation of mineral oils and the like in a cyclic course comprising a main column, a superheater connected with said main column, means connected with said main column for cooling the vapors and steam and for heating the mineral oil, means for using part of said partly cooled steam and the oil vapors for distillation, and means for superheating the remaining part of the vapors and steam and returning the remaining part of the vapors and steam to the superheater and then returning the same into the cyclic course.

4. Apparatus for the continuous distillation of mineral oils and the like, comprising in combination, a column for distilling the mineral oils having a higher boiling point than that of water by superheated steam, a receptacle connected with said column for separating the products of distillation, a steam superheater connected to a source of steam adapted to receive one portion of the steam from said receptacle for superheating and for feeding the column, and a first column for distilling the mineral oils having a lower boiling point than that of water by the other portion of the steam and the oil vapors coming from said receptacle connected to the main column.

5. Apparatus for the continuous distillation of mineral oils and the like comprising in combination, a main column for distilling the mineral oils having a higher boiling point than that of water by superheated steam, a cooler for separating the products of distillation, a steam superheater adapted to receive one portion of the steam from said cooler for superheating and for feeding the column, and a first column for distilling the mineral oils having a lower boiling point than that of water by the other portion of the steam coming from said cooler connected to the main column, and a first cooler connected to said first column for precipitating the gaseous distillates.

6. Apparatus for the continuous distillation of mineral oils and the like comprising in combination, a main column for distilling the mineral oils having a higher boiling point than that of water by superheated steam, a cooler for separating the products of distillation, a steam superheater adapted to receive one portion of the steam from said cooler for superheating the column, and a first column for distilling the mineral oils having a lower boiling point than that of water by the other portion of the steam and by the oil vapors coming from said cooler connected to the main column, and a dephlegmator for treating the crude product, and another dephlegmator for washing and rectifying the gaseous distillates.

7. Apparatus for the continuous distillation of mineral oils and the like comprising in combination, a main column for distilling the mineral oils having a higher boiling point than that of water by superheated steam, a cooler for separating the products of distillation, a steam superheater adapted to receive one portion of the steam from said cooler for superheating, and for feeding the column, a first column for distilling the mineral oils having a lower boiling point than that of water by the other portion of the steam and the oil vapors coming from the cooler connected to the main column, and a dephlegmator for treating the crude product, and another dephlegmator for washing and rectifying the gaseous distillates.

8. Apparatus for the continuous distillation of mineral oils and the like, comprising in combination, a main column for distilling the mineral oils having a higher boiling point than that of water by superheated steam, a cooler communicating with said main column for separating the distillates by precipitating the gaseous parts thereof, a superheater adapted to receive the other portion of the steam coming from said cooler for superheating and for subsequently feeding the superheated steam to said main column, a heat exchange apparatus between said cooler and the dephlegmator heated by the residue from the said dephlegmator apparatus and adapted for preliminarily heating the product coming from said cooler and conducted to the dephlegmator for subjecting the same to distillation.

9. Apparatus for the continuous distillation of mineral oils and the like, comprising in combination, a main column for distilling the mineral oils having a higher boiling point than that of water by superheated steam, a cooler for separating the products of distillation, a steam superheater adapted to receive one portion of the steam from said cooler for superheating, and for feeding the main column, a first column for distilling the mineral oils having a lower boiling point than that of water by the other portion of the steam coming from said cooler connected to the main column, a dephlegmator for heating the crude product and means for washing and rectifying the gaseous distillates, and a heat exchange apparatus heated by the residue from said main column and preliminarily heated by the crude product coming from said dephlegmator and entering the first column.

In testimony whereof, I affix my signature in the presence of two witnesses.

CARL HEINRICH BORRMANN. [L. S.]

Witnesses:
HELEN NUFER,
ALBERT NUFER.